INVENTOR.
ROBERT S. ALLARD
BY
John A. Weygandt
ATTORNEY.

INVENTOR.
ROBERT S. ALLARD
BY
John A. Weygandt
ATTORNEY.

United States Patent Office 3,623,869

Patented Nov. 30, 1971

3,623,869
METHOD FOR IMAGING DIAZOSULFONATE PHOTOREPRODUCTION MATERIALS

Robert S. Allard, Chicopee Falls, Mass., assignor to The Plastic Coating Corporation, South Hadley, Hampshire County, Mass.

Filed Oct. 27, 1969, Ser. No. 869,483
Int. Cl. G03c *1/56, 5/00*
U.S. Cl. 96—49 2 Claims

ABSTRACT OF THE DISCLOSURE

Disclosed are a process for forming images in reversal diazosulfonate photoreproduction material at elevated temperature, and means for maintaining the material at elevated temperature during the imaging step.

BACKGROUND OF THE INVENTION

Field of the invention

The invention described herein was made under a contract with the U.S. Air Force. The present invention relates to diazotype photographic reproduction material, and more particularly to a method for forming dense images therein.

DESCRIPTION OF THE PRIOR ART

In U.S. patent application Ser. No. 464,447, now U.S. Pat. No. 3,479,183, issued Nov. 18, 1969, there is disclosed and claimed a negative-working or reversal diazo photoreproduction material made from a formulation comprising a diazosulfonate and a coupler (i.e. a color former) therefore. The formulation is applied as a discrete layer in an alkaline medium upon the surface of a support. The material is useful for photographically reproducing images contained in master transparencies, such as microfilm and aerial photographs, through the chemical action of light on the diazo formulation. The image-producing process described in the aforementioned patent application comprises the steps of image-wise exposing the diazo imaging-material to actinic illumination (blue-violet and ultraviolet light of wave lengths less than 5000 A) to convert the diazosulfonate to an active diazonium compound which couples with a couplng component to provide a dye-image in the light-struck areas; acidifying the discrete layer with dry acid vapor; and light clearing the unreacted diazosulfonate by exposing it to overall actinic illumination, thereby forming colorless decomposition products of the diazosulfonate to produce a stable, fixed, dye-image against a clear background.

When the diazosulfonate is exposed to actinic light, two reaction mechanisms can proceed: isomerization and coupling, in which case the diazosulfonate converts to an active form which, in turn, couples with a color-former thereby producing a dye; and decomposition, in which case nitrogen is released, thereby destroying the diazo compound and hence eliminating the possibility of forming a dye. The diazosulfonate photoreproduction material is exposed under the conditions which favor isomerization and coupling; it is cleared under the conditions which favor decomposition.

When the reversal diazo imaging-formulation of the above-mentioned patent application is exposed to actinic radiation of very high flux or intensity the phenomenon known as "reciprocity failure" is observed. The cause is believed to be the decomposition of the transistory diazonium compound during exposure to light. Apparently under high flux the decomposition rate exceeds the coupling rate and a weak image results. Consequently, as the light intensity is increased above a certain level, the density of the image begins to decline, i.e. there is a failure of the image-density to reciprocate, or correspond, to the intensity of the incident light. In other words, reciprocity failure limits the maximum density which can be achieved after exposure, acidification and clearing of the reversal diazo photoreproduction material.

Since the aforementioned reversal diazo imaging-formulation forms an image as it is exposed to light, the density of the image obtained is a direct function of exposure energy. It has thus far appeared that an exposure time considerably longer than that necessary for a positive working system was required in order to form a dense image. As a consequence, the printing speed of such reversal diazosulfonate photoreproduction material has been relatively low.

SUMMARY OF THE INVENTION

Accordingly, it is an object of the present invention to eliminate reciprocity failure in reversal diazosulfonate photoreproduction material.

Another object of the present invention is to increase the maximum image-density which can be achieved in reversal diazosulfonate photoreproduction material.

A further object is to decrease the time required to expose reversal diazosulfonate photoreproduction material and thereby increase its printing speed.

Other objects, advantages and features of the invention will become more readily understood from the following detailed description when read in conjunction with the appended claims and attached drawings wherein:

The present invention relates to the discovery that the tendency of the decomposition rate to exceed the coupling rate under high flux can be reversed by exposing the photoreproduction material at elevated temperatures. While it would appear to one of ordinary skill in the art that raising the temperature would concomitantly increase the rates of coupling and of decomposition, and hence simply produce reciprocity failure faster, it has been found by the present inventor that the rate of the coupling reaction increases faster with increasing temperature than than rate of the decomposition reaction. As a consequence thereof, as the intensity of the light incident on the heated material is increased, the density of the image continues to increase to a value which approaches the maximum inherent in the concentration of diazosulfonate. A further consequence of the increased coupling rate is a reduction of the time necessary to produce an image of the desired density.

In accordance with the present invention, the reversal diazosulfonate photoreproduction material is imaged more rapidly and without reciprocity failure by raising the temperature of the material above 100° F. and exposing the material to actinic radiation while maintaining the temperature above 100° F. but below the thermal degradation point of both the master transparency and copy material. By "thermal degration point" is meant that temperature at which chemical or physical breakdown of the imaging formulation or support occurs, or physical distortion of either the master transparency or copy material is induced by irregular expansion at elevated temperatures. This invention provides means for forming an image in reversal diazosulfonate photo-reproduction material comprising heating means whereby the temperature of the material is raised above 100° F., and a light source capable of supplying actinic radiation without raising the temperature of the master and copy material above the thermal degradation point. In a particular embodiment, the light source comprises a lamp and filter means for blocking radiation of wave-lengths which raise the temperature of the master and copy material.

DETAILED DESCRIPTION

Figure 1:
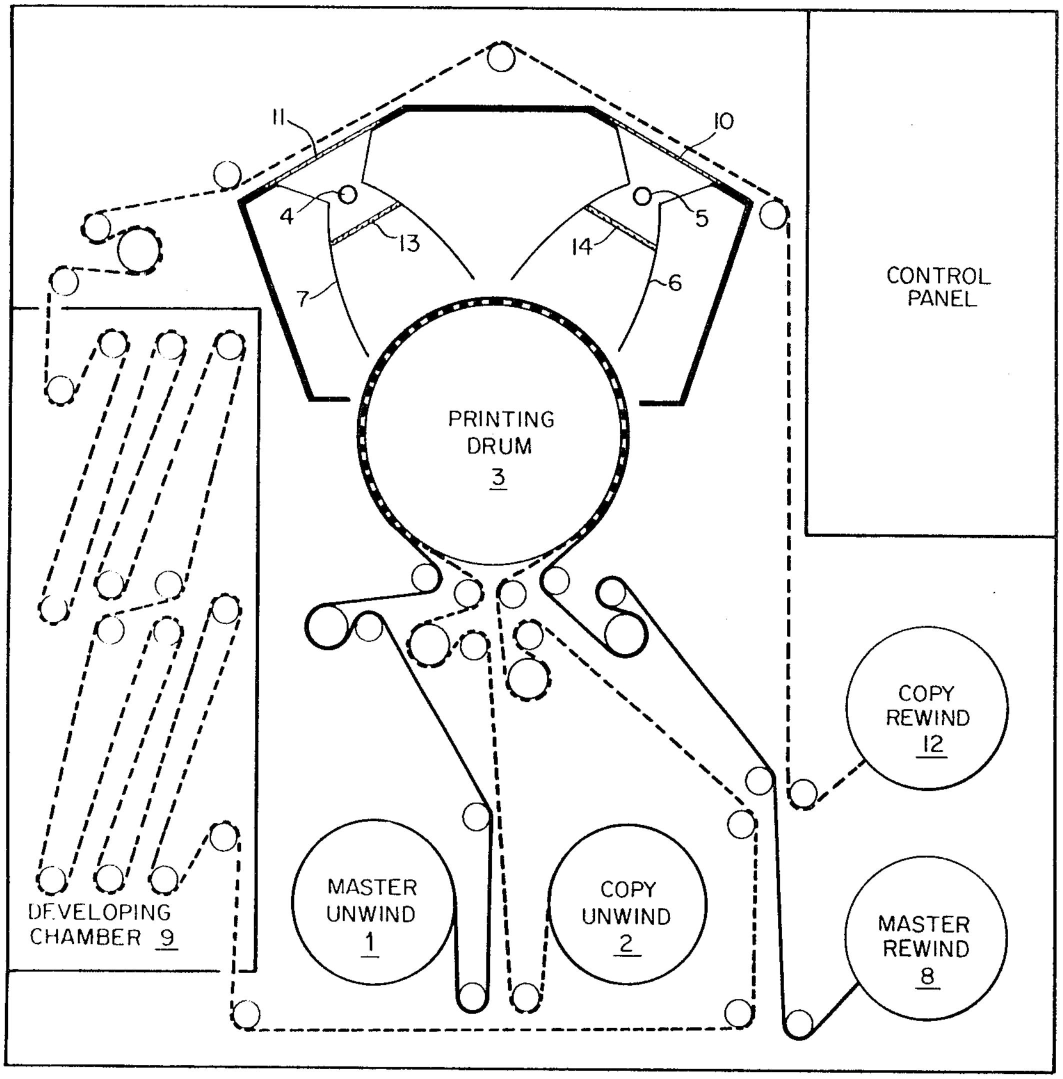
FIG. 1 is a schematic representation of apparatus for imaging and processing diazo-type photoreproduction material.

FIG. 1 is a schematic representation of apparatus suitable for imaging and processing diazo-type photoreproduction material. The master, containing the image to be reproduced, is a transparency, typically a silver-halide emulsion film, and is provided in the form of a roll 1. The negative-working diazosulfonate photoreproduction copy material, also in roll form 2, is normally a transparency, although sensitized paper or other opaque copy material may be used. The master and copy pass to the printing area in constant alignment to ensure high resolution. The master is superimposed on the copy material and is in physical contact therewith as the two are carried by thermally conductive support means in the form of a drum 3 through the printing area where they are exposed to actinic illumination from lamps 4 and 5 provided with reflectors 6 and 7. After the exposure step, the master is rewound on roll 8. The diazo-type reproduction material then passes to a developing chamber 9, which in the case of reversal diazosulfonate material contains acid vapor, such as acetic or formic acid vapor. After acidification, the reproduction material is directed past the lamps 4 and 5 for clearing or fixing by actinic illumination directed through windows 10 and 11. The developed copy is then rewound on roll 12.

In accordance with the present invention, the diazosulfonate photoreproduction material is exposed to actinic light at a temperature above 100° F. and preferably between 130–160° F. There are several factors which must be taken into consideration in order to successfully accomplish this objective. While in principle the desired effect would be achieved by raising the temperature of only the diazosulfonate copy material, when it is brought into contact with a cold master its temperature is substantially reduced. Accordingly, from this practical consideration, it is necessary to heat the master as well as the copy material. Furthermore, so that the copy material does not cool before reaching the imaging area, the copy material must be brought to the proper temperature just prior to the time it passes into the imaging area. In accordance with the present invention, it is preferred to provide the support in the imaging area with heating means so that thermal energy is transferred from the printing drum to the diazosulfonate-sensitized copy material and thence to the master.

Yet another consideration derives from the fact that the lamps which provide the illumination necessary to image and clear the diazosulfonate material are of substantial power and generate considerable thermal radiation in addition to the desired actinic radiation. By way of example, in one specific embodiment, two 7,000-watt mercury arc-lamps are used. Accordingly, without the special provisions of the present invention, these lamps can raise the temperature of the master or copy beyond its thermal degradation point. The silver-halide emulsion is particularly sensitive in this regard and cannot practically withstand temperatures in excess of 180° F.

Of course, it would be convenient to use light sources which generate only actinic radiation, but currently such lamps are not commercially available. Therefore, in accordance with this invention optical filters 13 and 14 are placed, as shown in FIG. 1, between the lamp and the surface of the printing drum to block radiation of wavelengths longer than 5000 A. In a preferred embodiment, this purpose is accomplished by dichroic filters which reflect away from the printing surface all radiation outside a band between 3500 A. and 4800 A. Additionally, in certain instances, depending on the design of the apparatus housing, it may be desirable to provide the printing area with forced-air ventilation means, such as a fan or blower, to cool the lamps.

Figure 2:
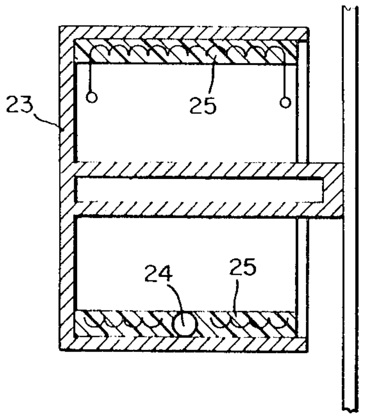
FIG. 2 is a view, partially in cross-section, of the printing drum depicted in FIG. 1.

Referring now to the specific example depicted in FIG. 2, to the inside of the printing drum 23, made of a thermally conductive material such as metal, is bonded a thermoelement 24, for example, a thermistor. Heating means 25, a suitable embodiment being resistive wires embedded in an insulating material, are provided adjacent the inside surface of the drum, i.e. the surface opposite the surface in contact with the photoreproduction material. As will be readily understood by those of ordinary skill in the art, by proper selection of the thermoelement and suitable electrical connection of the heating means to the thermoelement and a power source, the metal drum can be maintained at a constant, preselected temperature. When copying from a silver-halide emulsion film, it is preferred to maintain the drum at approximately 130° F.

Figure 3:
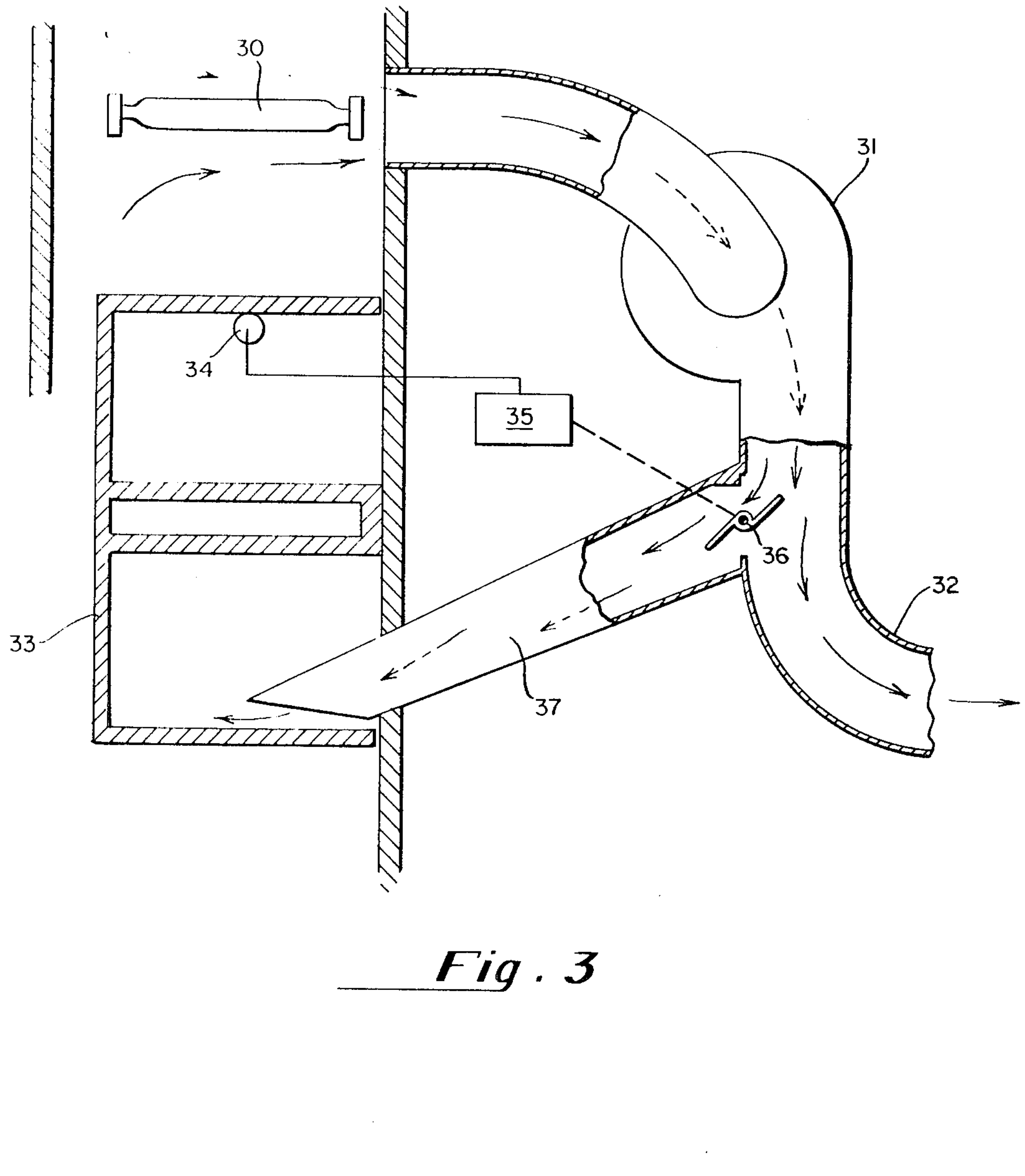
FIG. 3 is a schematic representation of an alternative arrangement of apparatus of the type depicted in FIG. 1.

FIG. 3 depicts an alternative means for heating the printing drum wherein air which has been used to cool the lamps is employed as a source of thermal energy. Referring now to the drawing, air is drawn past the lamp 30 by blower 31 and away from the apparatus through exhaust 32. The printing drum 33 is provided with a temperature sensor 34 which is connected to actuating means 35 which opens damper valve 36 when the temperature of the drum 33 falls below a preselected level, thereby permitting the hot air from blower 31 to pass through duct 37 into the interior of printing drum 33. Various means for directing the heated air to the printing drum 33 other than the damper 36, may readily be devised by one skilled in the art. By way of example, a fan to direct air into duct 37 can be connected to actuating means 35.

In certain cases, depending on the amount of thermal energy generated by the printing lamps and the distance the heated air must travel to the printing drum 33, it is necessary to provide supplemental means for heating the diazosulfonate copy material just before it passes into the exposure area, for example immediately below the printing drum 33 in FIG. 3. The diazocopy material will tend to cool after it leaves the supplemental, pre-heating means and, accordingly, the requirements for blocking thermal radiation from the light source are not as strict as when employing heating means of the type depicted in FIG. 2. In fact, it is to a limited extent desirable to permit more radiant energy from the light source to reach the reproduction material and the printing drum.

It will further be apparent that still other modifications would be necessary if the imaging lamps were placed inside a transparent printing drum, as is found in many kinds of diazotype reproduction machines. In such a case, the lamp would serve both as a light source and a heating means for the support. It should, therefore, be understood that the forms of the present invention described above and shown in the accompanying drawings are intended to be illustrative only and that other variations and modifications may be made by one of ordinary skill in the art without departing from the spirit and scope of the invention as defined by the appended claims.

What is claimed is:

1. In a method of imaging reversal diazosulfonate photoreproduction material comprising the steps of providing a discrete layer having applied thereto a diazosulfonate and a coupler, image-wise exposing the diazo imaging-material to actinic radiation to convert the diazosulfonate to an active diazonium compound to provide a dye-image in the light-struck areas, acidifying the discrete layer with dry acid vapor, and light clearing the unreacted diazosulfonate by exposing it to overall actinic radiation to produce a stable, fixed, dye-image against a clear background, the improvement comprising the steps of heating said reversal diazosulfonate photoreproduction material to a temperature above 100° F., and while image-wise exposing the material to actinic radiation, maintaining the temperature of said material above 100° F. but below the thermal degradation point of said material.

2. The method in accordance with claim 1 wherein said temperature is 130–160° F.

References Cited

UNITED STATES PATENTS

| | | | |
|---|---|---|---|
| 3,309,200 | 3/1967 | Berman et al. | 96—49 |
| 3,479,183 | 11/1969 | Habib et al. | 96—85 X |

JOHN T. GOOLKASIAN Primary Examiner

J. C. GIL, Assistant Examiner

U.S. Cl. X.R.

250—65.1